United States Patent
Sakai et al.

(10) Patent No.: US 9,186,771 B2
(45) Date of Patent: Nov. 17, 2015

(54) METHOD OF MANUFACTURING A GLASS SUBSTRATE FOR A MAGNETIC DISK AND METHOD OF MANUFACTURING A MAGNETIC DISK

(75) Inventors: Hideo Sakai, Tokyo (JP); Yosuke Suzuki, Tokyo (JP); Yoshihiro Tawara, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 147 days.

(21) Appl. No.: 13/435,293

(22) Filed: Mar. 30, 2012

(65) Prior Publication Data

US 2012/0251711 A1 Oct. 4, 2012

(30) Foreign Application Priority Data

Mar. 31, 2011 (JP) ................. 2011-080153

(51) Int. Cl.
| | | |
|---|---|---|
| *B24B 37/04* | (2012.01) | |
| *B08B 3/04* | (2006.01) | |
| *B08B 3/12* | (2006.01) | |
| *B24B 37/08* | (2012.01) | |
| *G11B 5/84* | (2006.01) | |
| *C09G 1/02* | (2006.01) | |

(52) U.S. Cl.
CPC ............. *B24B 37/044* (2013.01); *B08B 3/04* (2013.01); *B08B 3/12* (2013.01); *B24B 37/08* (2013.01); *C09G 1/02* (2013.01); *G11B 5/8404* (2013.01)

(58) Field of Classification Search
None
See application file for complete search history.

(56) References Cited

U.S. PATENT DOCUMENTS

| | | | | |
|---|---|---|---|---|
| 3,268,071 A | * | 8/1966 | Puddington et al. | 209/5 |
| 5,647,989 A | * | 7/1997 | Hayashi et al. | 210/641 |
| 5,965,027 A | * | 10/1999 | Allen et al. | 210/638 |
| 6,236,542 B1 | | 5/2001 | Hartog et al. | |
| 6,325,698 B1 | * | 12/2001 | Wada et al. | 451/8 |
| 6,752,692 B2 | * | 6/2004 | Wada et al. | 451/8 |
| 2001/0006224 A1 | * | 7/2001 | Tsuchiya et al. | 252/79 |
| 2001/0039766 A1 | * | 11/2001 | Hattori et al. | 51/308 |
| 2003/0164005 A1 | * | 9/2003 | Saito et al. | 65/30.14 |
| 2004/0127148 A1 | * | 7/2004 | Hamanaka et al. | 451/60 |
| 2005/0126588 A1 | * | 6/2005 | Carter et al. | 134/3 |
| 2006/0070980 A1 | * | 4/2006 | Marumo et al. | 216/88 |
| 2011/0240594 A1 | * | 10/2011 | Hamaguchi et al. | 216/22 |

FOREIGN PATENT DOCUMENTS

| | | | | |
|---|---|---|---|---|
| JP | 7-240025 A | | 9/1995 | |
| JP | 09022885 | * | 1/1997 | ............ H01L 21/304 |
| JP | 2003-173518 A | | 6/2003 | |
| WO | WO2010074002 | * | 7/2010 | ............ B24B 37/044 |

OTHER PUBLICATIONS

English translation of JP 09-022885 (Nakamura) accessed on Feb. 20, 2015.*

* cited by examiner

*Primary Examiner* — Mandy Louie
(74) *Attorney, Agent, or Firm* — Sughrue Mion, PLLC

(57) ABSTRACT

In a magnetic disk glass substrate manufacturing method, a main surface of a glass substrate is polished using a polishing liquid containing colloidal silica abrasive particles as polishing abrasive particles and a surface plate with a polishing pad, then the glass substrate is brought into contact with a liquid containing a coagulant so that the colloidal silica abrasive particles are coagulated, and then the colloidal silica abrasive particles coagulated are removed.

14 Claims, 2 Drawing Sheets

US 9,186,771 B2

METHOD OF MANUFACTURING A GLASS SUBSTRATE FOR A MAGNETIC DISK AND METHOD OF MANUFACTURING A MAGNETIC DISK

This application is based upon and claims the benefit of priority from Japanese patent application No. 2011-080153, filed on Mar. 31, 2011, the disclosure of which is incorporated herein in its entirety by reference.

TECHNICAL FIELD

This invention relates to a method of manufacturing a glass substrate for a magnetic disk adapted to be mounted in a magnetic disk device such as a hard disk drive (HDD) and further relates to a method of manufacturing the magnetic disk. Hereinafter, a glass substrate for a magnetic disk may also be referred to as a magnetic disk glass substrate.

BACKGROUND ART

As an information recording medium adapted to be mounted in a magnetic disk device such as a hard disk drive (HDD), there is a magnetic disk. The magnetic disk is produced by forming a thin film such as a magnetic layer on a substrate and, conventionally, an aluminum substrate has been used as such a substrate. Recently, however, in response to the pursuit of higher recording density, the occupation ratio of glass substrates, which can shorten the distance between a magnetic head and a magnetic disk as compared with the aluminum substrate, has been gradually increasing. In order to minimize the flying height of the magnetic head, a glass substrate surface is precisely polished, thereby achieving higher recording density. In recent years, the demand for an increase in HDD recording capacity and a reduction in HDD price has been increasing more and more. In order to achieve this, higher quality and lower cost are required also for magnetic disk glass substrates.

High smoothness of a magnetic disk surface is essential for a reduction in the flying height of a magnetic head which is necessary for achieving higher recording density as described above. In order to obtain the high smoothness of the magnetic disk surface, a highly smooth substrate surface is, after all, required and thus it is necessary to precisely polish a glass substrate surface.

A conventional glass substrate polishing method is carried out using polyurethane-based polisher polishing pads while supplying a slurry (polishing liquid) containing a polishing abrasive of metal oxide such as cerium oxide or colloidal silica. A glass substrate with high smoothness can be obtained, for example, by polishing using a cerium oxide-based polishing abrasive and then by finish polishing (mirror polishing) using colloidal silica abrasive particles. Herein, for example, it is proposed to use a colloidal silica slurry, which is pH-adjusted to be acidic, for polishing a magnetic disk substrate (see JP-A-H7-240025 (Patent Document 1)). It is also proposed to use a colloidal silica slurry, which is adjusted to have a pH more than 10.2 and not more than 12 by adding alkali to a polishing liquid, for polishing a magnetic disk glass substrate (see JP-A-2003-173518 (Patent Document 2)).

SUMMARY OF THE INVENTION

In a current HDD, it is possible to achieve a recording density as high as about 500 Gbit/inch$^2$ and, for example, it is possible to store information of about 320 GB in a 2.5-inch (diameter: 65 mm) magnetic disk. However, there has been a demand for achieving still higher recording density, for example, 375 to 500 GB and further 1TB per disk. Following such a demand for higher HDD capacity in recent years, the requirement for an improvement in substrate surface quality has become stricter than before. In the case of a next-generation substrate for a magnetic disk of, for example, 375 to 500 GB as described above, the substrate largely affects media characteristics and, therefore, a further improvement from a current product is required not only in terms of the roughness of a substrate surface, but also in terms of the absence of a surface defect due to adhesion of foreign matter or the like.

The reason that the next-generation substrate largely affects the media characteristics is as follows:

A significant reduction in the flying height of a magnetic head (distance between the magnetic head and a surface of a medium (magnetic disk)) is pointed out. Since this makes the distance between the magnetic head and a magnetic layer of the medium shorter, it is possible to pick up even a signal of a smaller magnetic particle and thus to achieve higher recording density. In recent years, the magnetic head has a function called DFH (Dynamic Flying Height) for the purpose of achieving a further reduction in flying height than before. Specifically, the magnetic head is provided with a heating portion such as an extremely small heater in the vicinity of a recording/reproducing element portion, thereby protruding only an area around and including the recording/reproducing element portion toward the medium surface. In future, it is expected that, with this DFH function, the distance between the element portion of the magnetic head and the medium surface will be as extremely small as less than 2 nm. Under these circumstances, if a convex surface defect due to adhesion of extremely small foreign matter (for example, having a size of about 10 to 40 nm at minimum) or the like, which did not arise as a problem conventionally, is present on a substrate surface while the average roughness of the substrate surface is extremely small, it directly becomes a convex defect even on the medium surface, and therefore, the possibility of collision with the magnetic head increases.

In the meantime, a slurry mixed with a polishing abrasive of metal oxide such as cerium oxide or colloidal silica and the quality of a glass substrate after polishing have a strong mutual relationship. For example, it is well known that, by controlling the particle size of the polishing abrasive contained in the slurry, the quality of a main surface of the glass substrate is effectively improved. According to a study by the present inventors, by controlling the particle size of the polishing abrasive contained in the slurry, for example, by the use of a polishing abrasive in the form of fine particles, the roughness of the main surface of the substrate can be reduced, while if the particles are too fine, there arises a problem such that the surface roughness increases conversely, that the end face shape is degraded, or that the polishing rate decreases. Further, only with the reduction in size of the polishing abrasive, the effect of the improvement in surface defect due to adhesion of foreign matter or the like is not obtained.

The requirement for the improvement in substrate surface quality following the demand for higher HDD capacity in recent years has become stricter than before so that there is a limit in achieving a further improvement in substrate surface quality by the conventional improvement technique.

This invention has been made for solving the above-mentioned problem and has an object to provide a magnetic disk glass substrate manufacturing method which can reduce the roughness of a substrate main surface and further can reduce surface defects due to adhesion of foreign matter or the like as compared with a conventional product, thereby being capable of manufacturing, at a low cost, a high-quality glass substrate that can be used as a next-generation substrate of which the requirement for the substrate surface quality is still stricter than the current requirement, and further to provide a method of manufacturing a magnetic disk using the glass substrate obtained by such a magnetic disk glass substrate manufacturing method.

In order to solve the above-mentioned problem, the present inventors have paid attention to the interaction between polishing abrasive particles contained in a polishing liquid and a glass substrate, which has not been fully studied before. When colloidal silica abrasive particles are used as polishing abrasive particles, since the colloidal silica abrasive particles are the same component as a main component of a glass substrate being an object to be polished, the colloidal silica abrasive particles tend to adhere to a surface of the glass substrate and cannot be easily removed even if cleaning is carried out after polishing. As a result, the colloidal silica abrasive particles remain adhering to the glass substrate surface and thus tend to be convex defects. In particular, when fine colloidal silica abrasive particles having a particle size of, for example, 40 nm or less are used for improving the surface roughness of the glass substrate, the abrasive particles tend to coagulate so that the occurrence of convex defects (foreign matter defects) due to adhesion of larger foreign matter becomes significant. Sometimes, there arises another problem that the surface roughness can not sufficiently be reduced. Even in presence of foreign matter defects (having a size of about 10 to 40 nm at minimum) due to fine colloidal silica abrasive particles or an aggregate thereof left on the substrate surface, no special problem has arisen previously. However, by the use of the DFH head and the like, the substrate largely affects media characteristics. In addition to the roughness of the substrate surface, the fine foreign matter defects described above become a new problem. Under the circumstances, further improvement is required also in terms of absence of surface defects due to adhesion of very small foreign matter.

The present inventors have also found the following problem. Specifically, the present inventors have found that, when fine colloidal silica abrasive particles are used in a polishing process, a polymer containing a sulfonic group (for example, an acrylic-based polymer containing a sulfonic group) is preferable as a dispersive agent for improving the dispersibility of the abrasive particles in a polishing liquid. However, as a result of a further study, it has been found that, when the dispersive agent such as the acrylic-based polymer containing the sulfonic group is contained in the polishing liquid used in the polishing process for the purpose of suppressing coagulation of the fine abrasive particles so as to improve the dispersibility of the abrasive particles as described above, the colloidal silica abrasive particles cannot be fully removed by cleaning after polishing. The reason for this is that since the fine colloidal silica abrasive particles are extremely well dispersed by adding the dispersive agent such as the acrylic-based polymer containing the sulfonic group to the polishing liquid, even if there is some coagulation, it is not at all possible to reach a size (2 μm or more) that can be efficiently removed by low-frequency ultrasonic cleaning (about 20 to 100 kHz). Further, there is a problem that the abrasive particles cannot be removed by high-frequency ultrasonic cleaning (about 300 to 2000 kHz) because the force of pulling apart the abrasive particles from the glass substrate surface is weak. By low-frequency ultrasonic cleaning, those particles having a size of 0.5 μm or more can be removed. However, the size which is particularly efficiently removable slightly varies depending on the frequency. For example, in case of 80 kHz and 40 kHz, the size which is particularly efficiently removable is within a range of about 2 to 4 μm and a range of about 3 to 5 μm, respectively.

As a result of a further intensive study, the present inventors have found that it is possible to coagulate and remove fine colloidal silica abrasive particles adhering to a main surface of a glass substrate by bringing the glass substrate into contact with a liquid containing a coagulant after polishing the main surface of the glass substrate using the colloidal silica abrasive particles to thereby form an aggregate of the colloidal silica abrasive particles using the coagulant as a binder and then by carrying out, for example, ultrasonic cleaning. It has been found that this invention is particularly effective when the dispersive agent such as the acrylic-based polymer containing the sulfonic group is added to the polishing liquid.

Specifically, this invention has the following structures.

(Structure 1)

A method of manufacturing a glass substrate for a magnetic disk, comprising:

polishing a main surface of the glass substrate using a polishing liquid containing colloidal silica abrasive particles as polishing abrasive particles and a surface plate with a polishing pad, then bringing the glass substrate into contact with a liquid containing a coagulant to coagulate the colloidal silica abrasive particles, and then removing the colloidal silica abrasive particles which have been coagulated.

(Structure 2)

The method according to the structure 1, wherein the coagulant contains at least one selected from lactic acid, salicylic acid, malic acid, and acrylamide.

(Structure 3)

The method according to the structure 1 or 2, wherein an aggregate of the colloidal silica abrasive particles is removed by ultrasonic cleaning.

(Structure 4)

The method according to any one of the structures 1 to 3, wherein a concentration of the coagulant in the liquid is in a range of 10 to 1000 ppm.

(Structure 5)

The method according to any one of the structures 1 to 4, wherein the polishing liquid contains a polymer containing a sulfonic group.

(Structure 6)

The method according to the structure 5, wherein the polymer containing the sulfonic group is an acrylic-based polymer containing a sulfonic group.

(Structure 7)

The method according to any one of the structures 1 to 6, wherein the colloidal silica abrasive particles have a particle size in a range of 10 to 40 nm.

(Structure 8)

The method according to any one of the structures 1 to 7, wherein the colloidal silica abrasive particles are obtained by hydrolysis of organosilicon compound.

(Structure 9)

The method according to any one of the structures 1 to 8, wherein a suede pad is used as the polishing pad.

(Structure 10)

The method according to any one of the structures 1 to 9, wherein the glass substrate is made of an amorphous aluminosilicate glass.

(Structure 11)

The method according to any one of the structures 1 to 10, wherein the glass substrate is a chemically strengthened glass substrate.

(Structure 12)

A method of manufacturing the magnetic disk, comprising:

forming at least a magnetic layer on the glass substrate obtained by the method according to any one of the structures 1 to 11.

According to this invention, it is possible to manufacture, at a low cost, a high-quality magnetic disk glass substrate with less roughness of a substrate main surface and with less surface defects due to adhesion of foreign matter or the like than a conventional product. The magnetic disk glass substrate obtained by this invention can be suitably used particularly as a next-generation substrate of which the requirement for the substrate surface quality is still stricter than the current requirement. Further, using the glass substrate obtained by this invention, it is possible to obtain a highly reliable magnetic disk which can operate stably over a long period of time even when combined with an extremely low flying height-designed magnetic head having a DFH function.

MODE FOR CARRYING OUT THE INVENTION

Figure 1:
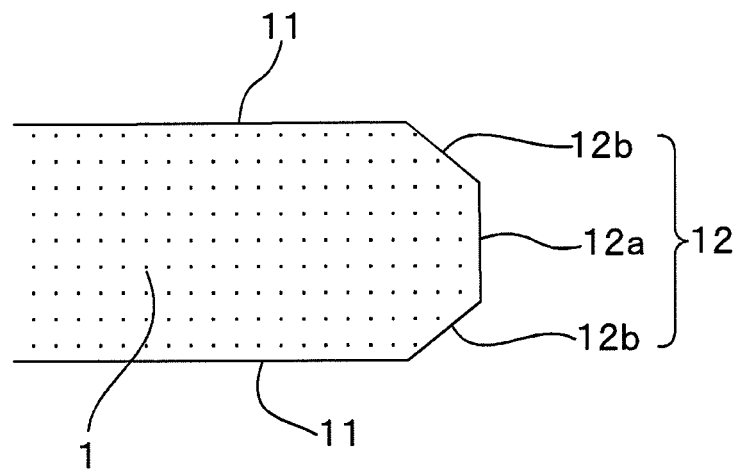
FIG. 1 is a cross-sectional view of a magnetic disk glass substrate.

Hereinbelow, an embodiment of this invention will be described in detail.

Normally, a magnetic disk glass substrate is manufactured through a rough grinding process (rough lapping process), a shaping process, a precision grinding process (precision lapping process), an end face polishing process, a main surface polishing process (first and second polishing processes), and a chemical strengthening process.

In the manufacture of the magnetic disk glass substrate, first, a molten glass is molded into a disk-shaped glass substrate (glass disk) by direct pressing. Alternatively, a plate glass may be manufactured by a downdraw method or a float method and then cut into a disk-shaped glass substrate (glass disk) with a predetermined size. Then, this molded glass substrate (glass disk) is ground (lapped) for improving the dimensional accuracy and shape accuracy thereof. In this grinding process, using normally a double-side lapping machine, main surfaces of the glass substrate are ground by the use of hard abrasive particles such as diamond abrasive particles. By grinding the main surfaces of the glass substrate in this manner, the glass substrate is machined to a predetermined thickness, flatness, and surface roughness.

After the completion of the grinding process, mirror polishing is carried out for obtaining a high-precision flat surface. Preferably, a glass substrate mirror-polishing method is carried out using polishing pads such as polyurethane polishing pads while supplying a slurry (polishing liquid) containing a polishing abrasive of metal oxide such as cerium oxide or colloidal silica.

As in Structure 1 described above, this invention is a method of manufacturing a magnetic disk glass substrate, comprising polishing a main surface of a glass substrate using a polishing liquid containing colloidal silica abrasive particles as polishing abrasive particles and a surface plate with a polishing pad, then bringing the glass substrate into contact with a liquid containing a coagulant to coagulate the colloidal silica abrasive particles, and then removing the colloidal silica abrasive particles coagulated.

A polishing liquid conventionally used in polishing is basically a combination of a polishing abrasive and water as a solvent and further contains a pH adjusting agent for adjusting the pH of the polishing liquid and other additives if necessary.

In this invention, a polymer containing a sulfonic group (for example, an acrylic-based polymer containing a sulfonic group) can be contained in the polishing liquid. This makes it possible to obtain an effect of improving the dispersibility of the polishing abrasive particles in the polishing liquid particularly when fine colloidal silica abrasive particles are used as the polishing abrasive particles.

The polymer containing the sulfonic group used in this invention is a copolymer containing at least one kind of monomer having a sulfonic group as a monomer component (such monomer may be referred to as a sulfonic acid). As the monomer having a sulfonic group, use may be made of, for example, isoprene sulfonic acid, (meth)acrylamide-2-methylpropane sulfonic acid, styrene sulfonic acid, methallyl sulfonic acid, vinyl sulfonic acid, allylsulfonic acid, and isoamylene sulfonic acid. Preferably, isoprene sulfonic acid or (meth)acrylamide-2-methylpropane sulfonic acid is used.

One kind of the monomer having a sulfonic group may be used alone or two or more kinds thereof may be used in combination.

As the polymer containing the sulfonic group for use in this invention, there is preferably cited, for example, an acrylic-based polymer containing a sulfonic group (for example, a copolymer of acrylic acid and a sulfonic group-containing monomer). As specific examples of the copolymer of the acrylic acid and the sulfonic group-containing monomer, there are cited, for example, Aron A-6016A, Aron A-6012, Aron A-6017, and Aron A-6020 (all are product names: manufactured by Toagosei Co., Ltd.). Among them, Aron A-6016A is particularly preferable because its molecular weight and viscosity are lower than those of the others so that a reduction in polishing rate is smaller as compared with the case where the others are added to the polishing liquid.

The addition amount of the polymer containing the sulfonic group in the polishing liquid is required to be such that the above-mentioned effect (i.e., the effect of improving the dispersibility of the abrasive particles in the polishing liquid when the fine colloidal silica abrasive particles are used) can be achieved well, and is preferably in a range of, for example, 0.01 to 1 wt %. If the addition amount is less than 0.01 wt %, there is a possibility that the above-mentioned effect is not sufficiently exhibited. On the other hand, if the addition amount exceeds 1 wt %, although the above-mentioned effect, i.e. the effect of improving the dispersibility of the polishing abrasive particles, can be obtained, there is a possibility that the friction between the glass substrate and the polishing pad in polishing becomes too small, leading to a reduction in polishing rate. One kind of the polymer containing the sulfonic group may be used alone or two or more kinds thereof may be used in combination.

In this invention, the polishing liquid containing the colloidal silica abrasive particles may be obtained by dispersing the colloidal silica abrasive particles in pure water, for example, RO water and, if necessary, adding the polymer containing the sulfonic group. Herein, the RO water represents RO (reverse osmosis)-treated pure water. It is particularly preferable to use RO-treated and DI-treated (deionized) RO-DI water. This is because the content of impurities such as alkali metal is extremely low and further the content of ions is also low in the RO or RO-DI water.

Preferably, the polishing liquid which is applied to a polishing process (in particular, a finish mirror polishing process (a later-described second polishing process)) of this invention is, for example, adjusted to the acidic region. For example, the polishing liquid is adjusted to a pH range of 2 to 4 by adding sulfuric acid thereto. The reason that the polishing liquid adjusted to the acidic region is preferably used in this invention is in terms of the productivity and cleanness.

The colloidal silica abrasive particles contained in the polishing liquid preferably have an average particle size of about 10 to 100 nm in terms of the polishing efficiency. Particularly, in this invention, polishing abrasive particles contained in a polishing liquid for use in a finish mirror polishing process (later-described second polishing process) preferably have an average particle size of about 10 to 40 nm, particularly as fine as about 10 to 20 nm, in terms of further reducing the surface roughness.

In this invention, the average particle size represents a particle size at a point of 50% of a cumulative curve (hereinafter referred to as a "cumulative average particle size (50% size)") when the cumulative curve is obtained by setting to 100% the total volume of a mass of particles in a particle size distribution measured by a light scattering method. Specifically, in this invention, the cumulative average particle size (50% size) is a value which is obtained by measurement using a particle size/particle size distribution measuring apparatus (Nanotrac UPA-EX150 manufactured by Nikkiso Co., Ltd.).

The colloidal silica abrasive particles used in this invention may be obtained by hydrolysis of organosilicon compound. Such abrasive particles hardly coagulate with each other but are easily adhered to the surface of the glass substrate after the polishing process. Therefore, this invention is effective.

A polishing method in the polishing process of this invention is not particularly limited. For example, the glass substrate and the polishing pad are brought into contact with each other and, while supplying the polishing liquid containing the polishing abrasive particles, the polishing pad and the glass substrate are moved relative to each other, thereby polishing the surface of the glass substrate to a mirror surface.

Figure 3:
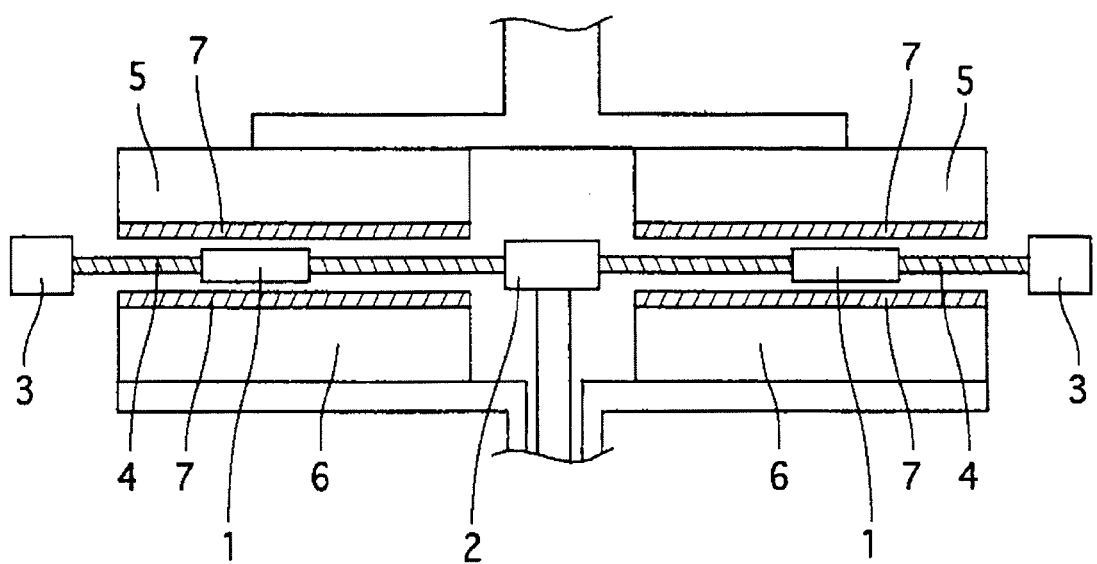
FIG. 3 is a longitudinal sectional view showing a schematic structure of a double-side polishing machine.

For example, FIG. 3 is a longitudinal sectional view showing a schematic structure of a planetary gear type double-side polishing machine which can be used in a mirror polishing process of glass substrates. The double-side polishing machine shown in FIG. 3 comprises a sun gear 2, an internal gear 3 concentrically disposed around the sun gear 2, a carrier 4 meshed with the sun gear 2 and the internal gear 3 and adapted to make an orbital motion while rotating on its axis according to the rotation of the sun gear 2 and the internal gear 3, upper and lower surface plates 5 and 6 respectively bonded with polishing pads 7 which are adapted to hold therebetween workpieces 1 held by the carrier 4, and a polishing liquid supply portion (not illustrated) which supplies a polishing liquid between the upper and lower surface plates 5 and 6.

Using this double-side polishing machine, while polishing, the workpieces 1, i.e. the glass substrates, held by the carrier 4 are pressed between the upper and lower surface plates 5 and 6 and, while supplying the polishing liquid between the polishing pads 7 of the upper and lower surface plates 5 and 6 and the workpieces 1, the carrier 4 makes an orbital motion while rotating on its axis according to the rotation of the sun gear 2 and the internal gear 3, thereby polishing both upper and lower surfaces of the workpieces 1.

As each polishing pad particularly for finish mirror polishing, it is preferable to use a soft-polisher polishing pad (suede pad). The hardness of the polishing pad is preferably 60 or more and 80 or less in Asker C hardness. A contact surface, with the glass substrate, of the polishing pad is preferably a resin foam, particularly a polyurethane foam, with foam pores open. When polishing is carried out in this manner, it is possible to polish the surfaces of the glass substrate to smooth mirror surfaces.

In this invention, as described above, after polishing the main surfaces of the glass substrate, the glass substrate is brought into contact with the liquid containing the coagulant to thereby coagulate the colloidal silica abrasive particles, which are then removed.

Due to its molecular structure, the coagulant has a nature that coagulant molecules are easily entangled with each other and that the coagulant is easily adsorbed to silicon dioxide. Therefore, when the colloidal silica abrasive particles with the coagulant adhered to their surfaces are brought into contact with each other, the bonding condition of an aggregate of the colloidal silica abrasive particles becomes strong.

In this manner, by, for example, immersing the glass substrate in the liquid containing the coagulant after the polishing, an aggregate of the colloidal silica abrasive particles is formed using the coagulant as a binder. Then, ultrasonic cleaning, for example, is carried out. Accordingly, the fine polishing abrasive particles adhering to the glass substrate surfaces can be coagulated and removed.

Preferably, the abrasive particles are coagulated so as to form an aggregate having a size in a range of about 0.5 μm or more that can be removed by low-frequency ultrasonic cleaning (about 20 kHz to 100 kHz). More preferably, the abrasive particles are coagulated so as to form an aggregate having a size in a range of about 2 to 5 μm because the aggregate of such a size is efficiently removable.

It is preferable to stir or slightly heat (up to about 50° C.) the liquid containing the coagulant because coagulation is promoted and a processing time can be shortened.

As the coagulant which is preferably used in this invention, there is cited, for example, lactic acid, salicylic acid, malic acid, or acrylamide. One kind of these coagulants may be used alone or two or more kinds thereof may be used in combination.

In this invention, carboxylic acid coagulants (lactic acid, salicylic acid, malic acid, etc.) are preferably used because the coagulant must be finally removed by cleaning. All of the above-cited coagulants are water-soluble as far as in a concentration range later mentioned but are different in solubility from one another. If the solubility is low, rinsing is difficult so that the coagulant may not finally be removed.

The carboxylic acid coagulants are preferable because the solubility is higher as compared with acrylamide. Among the carboxylic acid coagulants, those having a lower molecular weight are preferable because the solubility is higher. Lactic acid is particularly preferable.

The concentration of the coagulant is preferably in a range of 10 to 1000 ppm (volume ratio) and particularly preferably in a range of 10 to 100 ppm. The coagulant concentration is preferably as small as possible, but if it is less than 10 ppm, the above-mentioned effect, i.e. the effect of coagulating the colloidal silica abrasive particles, cannot be sufficiently obtained. On the other hand, if it exceeds 1000 ppm, coagulation of the coagulant proceeds to form an aggregate of 2 μm or less that cannot be removed by ultrasonic cleaning, thus tending to cause contamination.

The liquid containing the coagulant is preferably neutral to acidic, more preferably has a pH in a range from 5 to 7. This is because, if the liquid containing the coagulant is alkali, the coagulant is prevented from being adhered to a polishing abrasive or the like. In particular, in case of the carboxylic acid coagulants, cations (such as Na ions and K ions) derived from alkaline substances (for example, NaOH and KOH) are bonded to carboxylic groups as an adsorption site to prevent adsorption. On the other hand, it is not preferred that the liquid containing the coagulant is highly acidic, because the roughness of the substrate surface is increased.

Although depending on the coagulant concentration, the treatment time is preferably about 10 to 500 seconds and is particularly preferably about 10 to 200 seconds. If the treatment time is less than 10 seconds, the above-mentioned effect cannot be sufficiently obtained. On the other hand, if it exceeds 500 seconds, coagulation of the coagulant proceeds to form an aggregate of 2 μm or less that cannot be efficiently removed by ultrasonic cleaning, thus tending to cause contamination.

The glass substrate may be brought into contact with the liquid containing the coagulant by a method of applying such a liquid on the surfaces of the glass substrate or a method using a shower instead of the method of immersing the glass substrate in such a liquid. The glass substrate may be rocked appropriately.

The ultrasonic cleaning after the coagulation mentioned above is preferably carried out in water or in a liquid adjusted to be alkali (for example, in a KOH solution). According to the study of the present inventors, by using the liquid adjusted to be alkali, the coagulant which has not been involved in coagulation tends to form salt so that the solubility is improved and rinsing is facilitated. On the other hand, with respect to the coagulant which has been used as a binder, the adsorption site is already closed. Therefore, no problem will arise if the liquid is alkali. A cleaning liquid for the ultrasonic cleaning has a pH preferably within a range of 11 to 14, more preferably within a range of 13 to 14. As a matter of course, the pH is desirably adjusted within a range such that the surface roughness of the glass substrate is not degraded.

An ultrasonic wave used in the ultrasonic cleaning preferably has a low frequency of, for example, about 20 kHz to 100 kHz.

The ultrasonic cleaning is preferably carried out for a time period of about 10 to 300 seconds. If the ultrasonic cleaning is carried out less than 10 seconds, the aggregate may not be fully removed by cleaning. On the other hand, if the ultrasonic cleaning is carried out more than 300 seconds, the aggregate once removed from the surface of the glass substrate may be broken and again adhered to the glass substrate.

Normally, the mirror polishing process is carried out through two stages, i.e. a first polishing process for removing cracks or strains remaining in the above-mentioned lapping process and a second polishing process for finishing the main surfaces of the glass substrate to a surface roughness low enough to provide smooth mirror surfaces while maintaining the flat surfaces obtained in the first polishing process (multi-stage polishing with three or more stages may be carried out). In this case, it is preferable that the process of bringing the glass substrate into contact with the liquid containing the coagulant be applied at least after the later-stage second polishing process.

In this invention, the type of glass forming the glass substrate is preferably an amorphous aluminosilicate glass. The surfaces of such a glass substrate can be finished to smooth mirror surfaces by mirror polishing and the strength thereof after the processing is excellent. As such an aluminosilicate glass, use can be made of an aluminosilicate glass which is free of phosphorus oxide and contains, as main components, 58 wt % to 75 wt % $SiO_2$, 5 wt % to 23 wt % $Al_2O_3$, 3 wt % to 10 wt % $Li_2O$, and 4 wt % to 13 wt % $Na_2O$. Alternatively, for example, use can be made of an amorphous aluminosilicate glass which is free of phosphorus oxide and contains, as main components, 62 wt % to 75 wt % $SiO_2$, 5 wt % to 15 wt % $Al_2O_3$, 4 wt % to 10 wt % $Li_2O$, 4 wt % to 12 wt % $Na_2O$, and 5.5 wt % to 15 wt % $ZrO_2$, wherein the weight ratio of $Na_2O/ZrO_2$ is 0.5 or more and 2.0 or less and the weight ratio of $Al_2O_3/ZrO_2$ is 0.4 or more and 2.5 or less. The glass is preferably free of alkaline earth metal oxide such as CaO or MgO. As such a glass, there can be cited, for example, N5 Glass (product name) manufactured by HOYA Corporation.

There is a case where heat resistance is required as a property of a next-generation substrate. As a heat-resistant glass in this case, use can be preferably made of, for example, a glass containing 50 mol % to 75 mol % $SiO_2$, 0 to 6 mol % $Al_2O_3$, 0 to 2 mol % BaO, 0 to 3 mol % $Li_2O$, 0 to 5 mol % ZnO, 3 mol % to 15 mol % $Na_2O$ and $K_2O$ in total, 14 mol % to 35 mol % MgO, CaO, SrO, and BaO in total, and 2 mol % to 9 mol % $ZrO_2$, $TiO_2$, $La_2O_3$, $Y_2O_3$, $Yb_2O_3$, $Ta_2O_5$, $Nb_2O_5$, and $HfI_2$ in total, wherein the mole ratio of [(MgO+CaO)/(MgO+CaO+SrO+BaO)] is in a range of 0.85 to 1 and the mole ratio of [$Al_2O_3$/(MgO+CaO)] is in a range of 0 to 30.

In this invention, the surface of the glass substrate after the above-mentioned mirror polishing is preferably a mirror surface with an arithmetic average roughness Ra of 0.20 nm or less, particularly 0.15 nm or less, and more preferably 0.12 nm or less and further with a maximum roughness Rmax of 2.0 nm or less. In this invention, Ra and Rmax each represent a roughness which is calculated according to the Japanese Industrial Standard (JIS) B 0601.

From a practical point of view, in this invention, the surface roughness (e.g. the maximum roughness Rmax, the arithmetic average roughness Ra) is preferably a surface roughness of a surface shape which is obtained by measuring a 1 μm×1 μm square area with a resolution of 512×256 pixels using an atomic force microscope (AFM).

In this invention, it is preferable to carry out chemical strengthening treatment before or after the mirror polishing process. As a method for the chemical strengthening treatment, it is preferable to use, for example, a low-temperature ion-exchange method which performs ion exchange in a temperature range not exceeding the glass transition point, for example, at a temperature of 300° C. or more and 400° C. or less. The chemical strengthening treatment is a treatment in which the glass substrate is brought into contact with a molten chemical strengthening salt so that alkali metal element ions having a relatively small ionic radius in the glass substrate are ion-exchanged with alkali metal element ions having a relatively large ionic radius in the chemical strengthening salt, thereby penetrating the alkali metal element ions having the relatively large ionic radius into a surface layer of the glass substrate to generate compressive stress on the surfaces of the glass substrate. Since the chemically strengthened glass substrate is excellent in impact resistance, it is particularly suitable for mounting in an HDD for mobile use, for example. As the chemical strengthening salt, an alkali metal nitrate such as potassium nitrate or sodium nitrate can be preferably used.

This invention is particularly effective if it is applied to a mirror polishing process (particularly, a finish polishing process) after a chemical strengthening process. Conventionally, a normal cleaning process is performed after completion of the mirror polishing process after the chemical strengthening process. In this case, however, the above-mentioned problem arises. Therefore, this invention is advantageously applied. At the surface of the glass substrate after chemical strengthening, the amount of alkali metal such as Na or K is increased.

Therefore, if foreign matters, such as silica abrasive particles, are adhered to the surface, carbonate of alkali ions may be adhered to the foreign matters as a core so that the defects become large.

Figure 2:
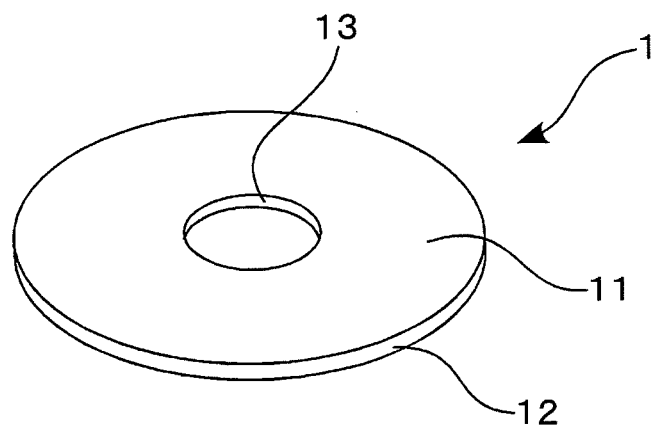
FIG. 2 is an overall perspective view of the magnetic disk glass substrate.

According to the magnetic disk glass substrate manufacturing method of this invention, as shown in FIGS. 1 and 2, there is obtained a disk-shaped glass substrate 1 having main surfaces 11 and 11 and, between them, an outer peripheral end face 12 and an inner peripheral end face 13. The outer peripheral end face 12 has a side wall face 12a and chamfered faces 12b and 12b on both sides of the side wall face 12a, each between the side wall face 12a and the corresponding main surface 11. The inner peripheral end face 13 also has the same shape.

This invention also provides a method of manufacturing a magnetic disk using the magnetic disk glass substrate described above. In this invention, the magnetic disk is manufactured by forming at least a magnetic layer on the magnetic disk glass substrate according to this invention. As a material of the magnetic layer, use can be made of a hexagonal-system CoCrPt-based or CoPt-based ferromagnetic alloy with a large anisotropic magnetic field. The magnetic layer is preferably formed on the glass substrate by a sputtering method, for example, a DC magnetron sputtering method. By interposing an underlayer between the glass substrate and the magnetic layer, it is possible to control the orientation direction and size of magnetic particles in the magnetic layer. For example, using a hexagonal-system underlayer containing Ru and Ti, it is possible to orient the easy magnetization direction of the magnetic layer along the normal of the plane of the magnetic disk. In this case, the magnetic disk of the perpendicular magnetic recording type is manufactured. The underlayer can be formed by the sputtering method like the magnetic layer.

It is preferable to form a protective layer and a lubricating layer in this order on the magnetic layer. As the protective layer, it is preferable to use an amorphous hydrogenated carbon-based protective layer. The protective layer can be formed, for example, by a plasma CVD method. As the lubricating layer, use can be made of a lubricant having a functional group at the ends of the main chain of a perfluoropolyether compound. Preferably, the lubricant is composed mainly of a perfluoropolyether compound having at its ends a hydroxyl group as a polar functional group. The lubricating layer can be coated and formed by a dipping method.

Using the magnetic disk glass substrate obtained by this invention, the highly reliable magnetic disk can be obtained.

EXAMPLES

Hereinbelow, the embodiment of this invention will be described in detail with reference to Examples. This invention is not limited to the following Examples.

Example 1

A magnetic disk glass substrate of this Example was manufactured through (1) Rough Lapping Process (Rough Grinding Process), (2) Shaping Process, (3) Precision Lapping Process (Precision Grinding Process), (4) End Face Polishing Process, (5) Main Surface First Polishing Process, (6) Chemical Strengthening Process, and (7) Main Surface Second Polishing Process, which will be described hereinbelow.

(1) Rough Lapping Process

First, a disk-shaped glass substrate made of an aluminosilicate glass and having a diameter of 66 mm and a thickness of 1.0 mm was obtained from a molten glass by direct pressing using upper, lower, and drum molds. Alternatively, a plate glass may be manufactured by a downdraw method or a float method and then cut into a disk-shaped glass substrate with a predetermined size. As the aluminosilicate glass, use was made of a glass for chemical strengthening containing 58 wt % to 75 wt % $SiO_2$, 5% W % to 23 wt % $Al_2O_3$, 3 wt % to 10 wt % $Li_2O$, and 4 wt % to 13 wt % $Na_2O$.

Then, a lapping process was applied to the glass substrate for improving the dimensional accuracy and shape accuracy thereof. This lapping process was carried out using a double-side lapping machine by the use of abrasive particles of particle size #400. Specifically, the glass substrate held by a carrier was placed in tight contact between upper and lower surface plates in the lapping machine and, then, by setting the load to about 100 kg and rotating a sun gear and an internal gear of the lapping machine, both main surfaces of the glass substrate received in the carrier were lapped to a surface accuracy of 0 to 1 μm and to a surface roughness (Rmax) of about 6 μm.

(2) Shaping Process

Then, using a cylindrical grindstone, a hole was formed at a central portion of the glass substrate. Then, grinding was applied to an outer peripheral end face to obtain an outer diameter of 65 mm and then predetermined chamfering was applied to the outer peripheral end face and an inner peripheral end face. In this event, the surface roughness of the end faces of the glass substrate was about 4 μm in Rmax. In general, a magnetic disk with an outer diameter of 65 mm is used in a 2.5-inch HDD (hard disk drive).

(3) Precision Lapping Process

Using a double-side lapping machine, this precision lapping process was carried out by placing the glass substrate, held by a carrier, in tight contact between upper and lower surface plates that were bonded with pellets containing diamond abrasive particles of particle size #1000 fixed with acrylic resin.

Specifically, by setting the load to about 100 kg and rotating a sun gear and an internal gear of the lapping machine, both main surfaces of the glass substrate received in the carrier were lapped to a surface roughness of about 2 μm in Rmax and about 0.2 μm in Ra.

The glass substrate having been subjected to the precision lapping process was immersed in respective cleaning baths (ultrasonic wave was applied) of neutral detergent and water in turn so as to be ultrasonically cleaned.

(4) End Face Polishing Process

Then, by brush polishing, the inner and outer peripheral end faces of the glass substrate were polished to a surface roughness of 1 μm in Rmax and about 0.3 μm in Ra while rotating the glass substrate. Then, the surfaces of the glass substrate having been subjected to the above-mentioned end face polishing were washed with water.

(5) Main Surface First Polishing Process

Then, a first polishing process for removing cracks or strains remaining in the above-mentioned lapping process was carried out using the double-side polishing machine shown in FIG. 3. In the double-side polishing machine, the glass substrate held by the carrier 4 is placed in tight contact between the upper and lower surface plates 5 and 6 each bonded with the polishing pad 7, the carrier 4 is brought into mesh with the sun gear 2 and the internal gear 3, and the glass substrate is pressed between the upper and lower surface plates 5 and 6. Then, by rotating the upper and lower surface plates 5 and 6 while supplying a polishing liquid between the polishing pads 7 and the polishing surfaces of the glass substrate, the glass substrate makes an orbital motion while rotating on its axis on the surface plates 5 and 6 so that both main surfaces of the glass substrate are polished simultaneously.

Specifically, using a hard polisher (hard urethane foam) as a polisher, the first polishing process was carried out. The pH of the polishing liquid was adjusted to neutral by adding an ethanol-based low molecular weight surfactant to RO water in which 10 wt % cerium oxide (average particle size: 1 μm) was dispersed as a polishing abrasive. The load was set to 100 g/cm$^2$ and the polishing time was set to 15 minutes.

The glass substrate having been subjected to the first polishing process was immersed in respective cleaning baths of neutral detergent, pure water, pure water, IPA (isopropyl alcohol), and IPA (vapor drying) in turn so as to be ultrasonically cleaned and dried.

(6) Chemical Strengthening Process

Then, chemical strengthening was applied to the glass substrate having been subjected to the above-mentioned cleaning. The chemical strengthening was carried out by preparing a chemical strengthening solution in the form of a mixture of potassium nitrate and sodium nitrate, heating this chemical strengthening solution to 380° C., and immersing the cleaned and dried glass substrate in the chemical strengthening solution for about 4 hours. The glass substrate having been subjected to the chemical strengthening was immersed in respective cleaning baths of neutral detergent, pure water, pure water, IPA, and IPA (vapor drying) in turn so as to be ultrasonically cleaned and dried.

(7) Main Surface Second Polishing Process

Then, a second polishing process was carried out using the same double-side polishing machine used in the first polishing process while changing the polishing pads to soft-polisher (suede) polishing pads (polyurethane foam with Asker C hardness of 72). This second polishing process is a mirror polishing process for finishing the main surface of the glass substrate to a smooth mirror surface with a surface roughness of, for example, about 2 nm or less in Rmax while maintaining the flat surface obtained in the first polishing process. A polishing liquid used was prepared by dispersing 15 wt % colloidal silica (average particle size: 15 nm) as a polishing abrasive into RO water, adding, as a dispersive agent, 0.3 wt % Aron A-6016A (product name: manufactured by Toagosei Co., Ltd.) as an acrylic/sulfonic copolymer to the RO water, and further adding sulfuric acid thereto to adjust the polishing liquid to be acidic (pH=2). The load was set to 100 g/cm$^2$ and the polishing time was set to 10 minutes.

A process of bringing the glass substrate having been subjected to the second polishing process into contact with a liquid containing a coagulant was performed. Specifically, the glass substrate was immersed in a pure water bath in which lactic acid was added at a concentration of 50 ppm (liquid temperature: ordinary temperature, pH: almost neutral) for 130 seconds. Thereafter, the glass substrate was immersed in a cleaning bath (pure water, ordinary temperature) so as to be ultrasonically cleaned at 80 kHz for 10 seconds and then was dried.

The surface roughness of main surfaces of 100 glass substrates each obtained through the above-mentioned processes was measured using an atomic force microscope (AFM). As a result, the surface roughness was 0.120 nm in Ra, representing an ultra-smooth surface smoother than a conventional product. The surface roughness value is the average value of the manufactured 100 glass substrates.

Further, the obtained 100 glass substrates were subjected to a foreign matter defect evaluation. The main surface of each glass substrate was observed using an optical surface analyzer (OSA) and a detected surface defect was analyzed using an atomic force microscope (AFM). As a result, good results of foreign matter defects (convex defects due to adhesion of foreign matter) being 10 points or less were obtained for all 100 glass substrates obtained in this Example.

According to this Example, it is possible to obtain a magnetic disk glass substrate with ultra-smooth surfaces smoother than a conventional product and further with less foreign matter defects than the conventional product so that it can be used as a next-generation substrate of which the requirement for the substrate surface quality is still stricter than the current requirement.

Example 2

The glass substrate was manufactured in the manner similar to Example 1 except that colloidal silica abrasive particles having an average particle size of 10 nm were used in the main surface second polishing process in Example 1.

Example 3

The glass substrate was manufactured in the manner similar to Example 1 except that colloidal silica abrasive particles having an average particle size of 40 nm were used in the main surface second polishing process in Example 1.

Example 4

The glass substrate was manufactured in the manner similar to Example 1 except that colloidal silica abrasive particles having an average particle size of 60 nm were used in the main surface second polishing process in Example 1.

Example 5

The glass substrate was manufactured in the manner similar to Example 1 except that the dispersive agent was not added in the main surface second polishing process in Example 1.

Example 6

The glass substrate was manufactured in the manner similar to Example 1 except that salicylic acid was used as the coagulant instead of lactic acid in the process of bringing the glass substrate into contact with the liquid containing the coagulant after the main surface second polishing process in Example 1.

Example 7

The glass substrate was manufactured in the manner similar to Example 1 except that malic acid was used as the coagulant instead of lactic acid in the process of bringing the glass substrate into contact with the liquid containing the coagulant after the main surface second polishing process in Example 1.

Example 8

The glass substrate was manufactured in the manner similar to Example 1 except that acrylamide was used as the coagulant instead of lactic acid in the process of bringing the glass substrate into contact with the liquid containing the coagulant after the main surface second polishing process in Example 1.

Example 9

The glass substrate was manufactured in the manner similar to Example 1 except that, in the main surface second polishing step in Example 1, a copolymer containing isoprene sulfonic acid was used as the dispersive agent instead of acrylic/sulfonic copolymer.

The glass substrates manufactured in Examples 2 to 9 mentioned above were subjected to measurement of the surface roughness of the main surface and foreign matter defect evaluation in the manner similar to Example 1. The results are collectively shown in the following Table 1.

Comparative Example

The glass substrate having been subjected to the second polishing process in Example 1 was directly immersed in the cleaning bath (pure water, ordinary temperature) so as to be ultrasonically cleaned at 80 kHz for 10 seconds and then was dried, i.e. the process of immersing the glass substrate in the pure water bath added with lactic acid was omitted.

A magnetic disk glass substrate was obtained in the same manner as in Example 1 except for this.

The surface roughness of main surfaces of 100 magnetic disk glass substrates each obtained in this Comparative Example was measured using an atomic force microscope (AFM). As a result, the surface roughness was 0.160 nm in Ra. Further, as a result of carrying out a foreign matter defect evaluation in the same manner as in Example 1, foreign matter defects were 100 points or more so that the occurrence of the foreign matter defects was significant. Accordingly, the obtained magnetic disk glass substrate is insufficient for use as a next-generation substrate of which the requirement for the substrate surface quality is still stricter than the current requirement.

A magnetic disk for perpendicular magnetic recording was obtained by applying the following film forming process to the magnetic disk glass substrate obtained in Example 1.

Specifically, an adhesive layer in the form of a Ti-based alloy thin film, a soft magnetic layer in the form of a CoTaZr alloy thin film, an underlayer in the form of a Ru thin film, a perpendicular magnetic recording layer in the form of a CoCrPt alloy thin film, a carbon protective layer, and a lubricating layer were laminated in this order on the glass substrate. The protective layer is for preventing degradation of the magnetic recording layer due to contact with a magnetic head and was made of hydrogenated carbon to obtain wear resistance. The lubricating layer was formed by a dipping method using an alcohol-modified perfluoropolyether liquid lubricant.

The obtained magnetic disk was incorporated into an HDD having a DFH head and was subjected to a one-month load/unload durability test while operating the DFH function in a high-temperature, high-humidity environment of 80° C. and 80% RH. As a result, no particular failure occurred and excellent results were obtained.

The obtained magnetic disk was also subjected to the following test. The results are shown in Table 1.

[DFH Element Portion Protruding Test]

With respect to each of the above-mentioned magnetic disks thus manufactured, a protruding test of a DFH head element portion was conducted using an HDF tester (head/disk flyability tester) manufactured by Kubota Comps Corporation. This test is conducted by gradually protruding the head element portion using a DFH mechanism and detecting a contact with a magnetic disk surface using an AE sensor to evaluate the distance when the head element portion is brought into contact with the magnetic disk surface. The magnetic disk with a greater protruding amount enables a smaller magnetic spacing and thus is suitable for higher recording density, thereby allowing a magnetic signal to be accurately recorded/reproduced.

As the head, use was made of a DFH head adapted for a 320 GB/P magnetic disk (2.5-inch size). The flying height of a head body with no protrusion of the element portion is 10 nm. Other conditions were set as follows:

Evaluation Radius: 22 mm
Rotational Speed of Magnetic Disk: 5400 rpm
Temperature: 25° C.
Humidity: 60%

[Evaluation Criterion]

Evaluation was made in the following three levels according to the protruding amount of the head.

oo: 8.0 nm or more
o: 7.0 nm or more and less than 8.0 nm
Δ: 5.0 nm or more and less than 7.0 nm
x: less than 5.0 nm By using each of the glass substrates obtained in Examples 2 to 9 and Comparative Example mentioned above, the magnetic disk for perpendicular magnetic recording was manufactured in the manner similar to that mentioned above. The manufactured magnetic disks were subjected to the DFH element portion protruding test. The results are collectively shown in Table 1.

TABLE 1

|  | Main Surface 2nd Polishing Process | | | | | |
| --- | --- | --- | --- | --- | --- | --- |
|  | Colloidal Silica Abrasive Particle Size [nm] | Dispersive Agent | Coagulant Used in Immersing | Surface Roughness Ra [nm] | Number of Foreign Matter Defects | DFH Protruding Test |
| Example 1 | 15 | added | lactic acid | 0.120 | 10 or less | oo |
| Example 2 | 10 | added | lactic acid | 0.110 | 10 or less | oo |
| Example 3 | 40 | Added | lactic acid | 0.125 | 10 or less | o |
| Example 4 | 60 | Added | lactic acid | 0.150 | 10 or less | Δ |
| Example 5 | 15 | not added | lactic acid | 0.140 | 10 or less | o |
| Example 6 | 15 | Added | salicylic acid | 0.118 | 10 or less | oo |
| Example 7 | 15 | Added | malic acid | 0.117 | 10 or less | oo |
| Example 8 | 15 | Added | acrylamide | 0.119 | 11 to 20 | o |
| Example 9 | 15 | Added (copolymer containing isoprene sulfonic acid) | lactic acid | 0.120 | 10 or less | oo |
| Comparative Example | 15 | Added | not added | 0.160 | 100 or more | X |

From the results in Table 1, it has been confirmed that, according to Examples of this invention, a magnetic disk glass substrate is obtained which has a further ultra-smooth surface as compared with conventional products and which can be reduced in number of foreign matter defects. According to Examples of this invention, it is possible to use the glass substrates as a next-generation substrate which is required to have a stricter substrate surface quality that that currently required. In the magnetic disk for perpendicular magnetic recording manufactured by using the glass substrates in Examples of this invention, the protruding amount of the DFH head is as large as 5.0 nm or more. Thus, an excellent result was obtained. Among these Examples, those using the colloidal silica abrasive particles having a particle size in the range of 10 nm to 40 nm are suitable. It has also been confirmed that this invention is particularly effective when the dispersive agent is added.

On the other hand, in Comparative Example, occurrence of the foreign matter defects is significant. Therefore, the glass substrate in Comparative Example is insufficient for use as a next-generation substrate which is required to have a stricter substrate surface quality than that currently required. In the magnetic disk for perpendicular magnetic recording which was manufactured by using the glass substrate in Comparative Example, the protruding amount of the DFH head is less than 5.0 nm. Thus, an excellent result was not obtained.

What is claimed is:

1. A method of manufacturing a glass substrate for a magnetic disk, comprising:
    polishing a main surface of the glass substrate using a polishing liquid containing colloidal silica abrasive particles as polishing abrasive particles and a surface plate with a polishing pad,
    bringing the glass substrate into contact with a liquid containing a coagulant to coagulate the colloidal silica abrasive particles adhered to the glass substrate and to thereby form an aggregate of the colloidal silica abrasive particles, and
    then removing the aggregate of the colloidal silica abrasive particles from the glass substrate by ultrasonic cleaning, wherein;
    the polishing liquid with the colloidal silica abrasive particles is adjusted to an acidic pH value,
    the liquid with the coagulant has a neutral to acidic pH range,
    the coagulant is a carboxylic acid coagulant which serves as a binder for the colloidal silica abrasive particles, and
    the coagulant contains at least one selected from the group consisting of lactic acid, salicylic acid, and malic acid.

2. The method according to claim 1, wherein a concentration of the coagulant in the liquid is in a range of 10 to 1000 ppm.

3. The method according to claim 1, wherein the polishing liquid contains a polymer containing a sulfonic group.

4. The method according to claim 3, wherein the polymer containing the sulfonic group is an acrylic-based polymer containing a sulfonic group.

5. The method according to claim 1, wherein the colloidal silica abrasive particles have a particle size in a range of 10 to 40 nm.

6. The method according to claim 1, wherein the colloidal silica abrasive particles are obtained by hydrolysis of organosilicon compound.

7. The method according to claim 1, wherein a suede pad is used as the polishing pad.

8. The method according to claim 1, wherein the glass substrate is made of an amorphous aluminosilicate glass.

9. The method according to claim 1, wherein the glass substrate is a chemically strengthened glass substrate.

10. A method of manufacturing the magnetic disk, comprising:
    forming at least a magnetic layer on the glass substrate obtained by the method according to claim 1.

11. The method according to claim 1, wherein a frequency of ultrasonic used in the ultrasonic cleaning falls within a range of 20 kHz to 100 kHz, and
    the aggregate is formed so as to have a size in a range of 2 to 5 µm.

12. The method according to claim 1, wherein the liquid containing the coagulant has a pH in a range of 5 to 7.

13. The method according to claim 1, wherein the ultrasonic cleaning is carried out in a liquid adjusted to have an alkali pH.

14. A method of manufacturing a glass substrate for a magnetic disk, comprising:
    polishing a main surface of the glass substrate using a polishing liquid containing colloidal silica abrasive particles as polishing abrasive particles and a surface plate with a polishing pad,
    bringing the glass substrate into contact with a liquid containing a coagulant to coagulate the colloidal silica abrasive particles adhered to the glass substrate and to thereby form an aggregate of the colloidal silica abrasive particles, and
    then removing the aggregate of the colloidal silica abrasive particles from the glass substrate by ultrasonic cleaning,
    wherein the coagulant, which serves as a binder for the colloidal silica abrasive particles, contains at least one selected from lactic acid and salicylic acid, and
    wherein the polishing liquid with the colloidal silica abrasive particles has an acidic pH value and the liquid with the coagulant has neutral to acidic pH range.

* * * * *